US012774769B2

(12) United States Patent
Jacobsen et al.

(10) Patent No.: US 12,774,769 B2
(45) **Date of Patent: *Oct. 27, 2026**

(54) FLUID HANDLING COUPLINGS

(71) Applicant: Colder Products Company, Roseville, MN (US)

(72) Inventors: Shaun J. Jacobsen, Minneapolis, MN (US); Elizabeth J. Langer, Minneapolis, MN (US); Emma N. Miller, St. Paul, MN (US)

(73) Assignee: Colder Products Company, Roseville, MN (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/761,754

(22) Filed: Jul. 2, 2024

(65) Prior Publication Data

US 2024/0353041 A1 Oct. 24, 2024

Related U.S. Application Data

(63) Continuation of application No. 18/089,062, filed on Dec. 27, 2022, now Pat. No. 12,038,115.

(60) Provisional application No. 63/297,476, filed on Jan. 7, 2022.

(51) Int. Cl.

| | |
|---|---|
| ***F16L 37/34*** | (2006.01) |
| ***F16L 37/084*** | (2006.01) |
| ***F16L 37/086*** | (2006.01) |
| ***F16L 37/35*** | (2006.01) |

(52) U.S. Cl.

CPC ........... *F16L 37/34* (2013.01); *F16L 37/0841* (2013.01); *F16L 37/086* (2013.01); *F16L 37/35* (2013.01)

(58) Field of Classification Search

CPC ......... F16L 37/34; F16L 37/35; F16L 37/413; F16L 37/086; F16L 37/0841

See application file for complete search history.

(56) References Cited

U.S. PATENT DOCUMENTS

| | | | | |
|---|---|---|---|---|
| 3,201,151 A * | 8/1965 | Westveer | F16L 37/34 | 285/361 |
| 3,217,746 A * | 11/1965 | Voisine | F16L 37/107 | 285/361 |
| 3,380,476 A * | 4/1968 | Torres | F16L 37/002 | 102/373 |
| 3,645,294 A * | 2/1972 | Allread | F16L 37/34 | 137/614 |

(Continued)

FOREIGN PATENT DOCUMENTS

| | | |
|---|---|---|
| CN | 111601997 A | 8/2020 |

OTHER PUBLICATIONS

Extended European Search Report in European Appln No. 22919213.3, dated Mar. 5, 2025, 9 pages.

(Continued)

*Primary Examiner* — David Colon-Morales

(74) *Attorney, Agent, or Firm* — Fish & Richardson P.C.

(57) ABSTRACT

Fluid couplings described herein are designed to prevent spillage of fluid when connecting and disconnecting the couplings. In some embodiments, the fluid couplings described herein include internal valve components. In example embodiments, the fluid couplings are designed with minimal component parts and are designed for easy assembly so that the fluid couplings are economical to produce.

20 Claims, 8 Drawing Sheets

(56) References Cited

U.S. PATENT DOCUMENTS

| | | | | |
|---|---|---|---|---|
| 4,991,627 | A * | 2/1991 | Nix | F16D 48/02 285/319 |
| 5,215,122 | A | 6/1993 | Rogers et al. | |
| 5,251,668 | A * | 10/1993 | Walther | F16L 37/34 285/306 |
| 5,316,041 | A * | 5/1994 | Ramacier, Jr. | F16L 37/32 285/317 |
| 5,406,980 | A | 4/1995 | Allread et al. | |
| 5,494,073 | A | 2/1996 | Saito | |
| 5,546,985 | A * | 8/1996 | Bartholomew | F16L 37/34 251/149.6 |
| 5,911,403 | A * | 6/1999 | deCler | B67D 7/0294 251/149.6 |
| 6,050,544 | A * | 4/2000 | Meronek | F16L 37/28 285/332.1 |
| 6,089,540 | A * | 7/2000 | Heinrichs | F16L 37/0841 251/149.6 |
| 6,161,578 | A * | 12/2000 | Braun | F16L 37/35 137/614.04 |
| 6,212,888 | B1 * | 4/2001 | Nix | F16D 25/12 60/592 |
| 6,328,348 | B1 * | 12/2001 | Cornford | F16L 37/34 285/305 |
| 6,588,452 | B2 * | 7/2003 | Marquart | F16L 37/35 137/614 |
| 6,649,829 | B2 * | 11/2003 | Garber | B67D 7/348 340/5.9 |
| 6,681,803 | B2 | 1/2004 | Taneya et al. | |
| 7,213,845 | B2 | 5/2007 | Sato et al. | |
| 7,469,472 | B2 * | 12/2008 | deCler | F16L 37/34 285/285.1 |
| 7,547,047 | B2 | 6/2009 | Decler et al. | |
| 8,764,068 | B2 * | 7/2014 | Frick | F16L 37/62 285/308 |
| 9,194,634 | B2 * | 11/2015 | Tiberghien | F16L 37/34 |
| 9,279,530 | B2 * | 3/2016 | Schmidt | F16L 37/0841 |
| 10,105,527 | B2 | 10/2018 | Wilhelm | |
| 10,184,569 | B2 * | 1/2019 | Thomas | F16K 1/465 |
| 10,190,713 | B2 * | 1/2019 | Tiberghien | F16L 37/32 |
| 10,197,201 | B2 * | 2/2019 | Ferrara | F16L 37/42 |
| 10,781,957 | B2 | 9/2020 | Tiberghien et al. | |
| 10,876,636 | B2 * | 12/2020 | Thomas | F16K 1/465 |
| 10,995,892 | B2 * | 5/2021 | Tiberghien | F16L 37/34 |
| 11,060,650 | B2 * | 7/2021 | Vranish | F16L 37/34 |
| 11,326,727 | B2 * | 5/2022 | Sung | F16L 37/0841 |
| 11,619,334 | B2 | 4/2023 | Langer | |
| 12,038,115 | B2 * | 7/2024 | Jacobsen | F16L 37/0841 |
| 2002/0079473 | A1 * | 6/2002 | Jeory | F16L 37/28 251/149.6 |
| 2002/0148514 | A1 | 10/2002 | Taneya et al. | |
| 2014/0261819 | A1 | 9/2014 | Vranish | |
| 2017/0009920 | A1 | 1/2017 | Canatella | |
| 2018/0209573 | A1 | 7/2018 | Tiberghien et al. | |
| 2021/0148499 | A1 | 5/2021 | Nick et al. | |
| 2021/0199223 | A1 * | 7/2021 | Langer | F16L 37/34 |

OTHER PUBLICATIONS

International Search Report and Written Opinion in International Appln. No. PCT/US2022/054071, mailed on Mar. 21, 2023, 9 pages.

* cited by examiner

FLUID HANDLING COUPLINGS

CROSS-REFERENCE TO RELATED APPLICATIONS

This application is a continuation application of U.S. patent application Ser. No. 18/089,062 filed on Dec. 27, 2022 (U.S. Pat. No. 12,038,115), which claims the benefit of U.S. Provisional Application Ser. No. 63/297,476 filed Jan. 7, 2022. The disclosure of the prior applications are considered part of (and are incorporated by reference in) the disclosure of this application.

TECHNICAL FIELD

This document relates to fluid handling couplings. For example, this document relates to fluid couplings that are designed to prevent spillage of fluid when connecting and disconnecting the couplings.

BACKGROUND

Fluid handling components such as fluid couplings allow fluid communication between two or more components. Some fluid couplings include features that allow male and female components to be quickly connected or disconnected, and may include one or more internal valve components that selectively block or allow flow of fluid through the coupling.

In the context of some fluid systems, such as a fluid system for liquid cooling of electronics, it may be desirable to use non-spill couplings that have minimal or zero fluid spillage during connection and disconnection of the male and female couplings. Such non-spill couplings will serve to limit the exposure of the electronics to the fluid that could damage the electronics, for example.

SUMMARY

This document describes fluid handling couplings. For example, this document describes fluid couplings that are designed to prevent spillage of fluid when connecting and disconnecting the couplings. In some embodiments, the fluid couplings described herein include internal valve components. In example embodiments, the fluid couplings are designed with minimal component parts and are designed for easy assembly so that the fluid couplings are economical to produce.

The fluid coupling devices described herein may also be referred to herein as male and female couplings, "coupling halves," and/or "connectors." The male couplings may also be referred to herein as "inserts," and the female couplings may also be referred to herein as "bodies."

In particular embodiments, the fluid coupling devices described herein are specifically designed with one or more mechanical components to configure the devices as "non-spill" coupling devices. The devices described herein are referred to as non-spill coupling devices because as the male and female portions of the coupling devices are being connected to each other and/or disconnected from each other, the designs of the fluid coupling devices will reduce the likelihood of fluid discharge out of the fluid system (for example, by blocking as such discharge paths) and by preventing spillage related to fluid contained within/between the male and female fluid coupling devices.

In one aspect, this disclosure is directed to fluid coupling that includes a main body, a valve cartridge, a retainer member, and a clip. The main body defines an internal space and a longitudinal axis. The valve cartridge is disposed within the internal space and includes: a cartridge housing; a valve stem coupled to the cartridge housing; and a valve member disposed between the valve stem and the cartridge housing. The valve member is longitudinally movable between: (i) an open position in which a fluid flow path through the fluid coupling is defined and (ii) a closed position in which the fluid flow path is blocked. The retainer member is disposed within the internal space. The cartridge housing is restrained longitudinally between the retainer member and the main body. The clip is movably coupled to the main body. The clip passes through: (i) a slot defined by the main body and (ii) a slot defined by the retainer member.

Such a fluid coupling may optionally include one or more of the following features. The main body may be a unitary molded member. The fluid flow path may extend through openings defined by the retainer member, the clip, the valve cartridge, and the main body. The valve cartridge may also include a spring positioned to bias the valve member to the closed position. The clip may be perpendicularly movable relative to the longitudinal axis. The fluid coupling may also include a first seal disposed between the valve stem and the valve member while the valve member is in the closed position; a second seal disposed between the valve member and the cartridge housing while the valve member is in the close position; and a third seal detained in the cartridge housing by the retainer member. The clip may be engaged within two slots defined by the main body. The clip may be engaged within three slots defined by the main body. The cartridge housing may include a plurality of radially-extending circumferential barbs. The plurality of radially-extending circumferential barbs may be frictionally engaged with an inner wall of the main body.

In another aspect, this disclosure is directed to a fluid coupling that includes a main body; a valve assembly in the main body; a retainer member in the main body; and a clip movably coupled to the main body. The clip detains the retainer member in a fixed position relative to the main body. The retainer member detains the valve assembly in a fixed position relative to the main body.

Such a fluid coupling may optionally include one or more of the following features. The clip may pass through slots defined by the main body and the retainer member. The main body may be a unitary member. The valve assembly may have a first configuration in which: (i) a fluid flow path is opened through the fluid coupling and (ii) a second configuration in which the fluid flow path is closed.

In another aspect, this disclosure is directed to a method of assembling a fluid coupling. The method includes inserting a valve assembly through a first end of a main body of the fluid coupling and into an internal space defined by the main body, and inserting a retainer member through the first end of the main body and abutting the retainer member against the valve assembly.

Such a method may optionally include one or more of the following features. The method may also include inserting a clip through slots defined by the main body and by the retainer member, wherein the clip detains the retainer member in a fixed position relative to the main body, and wherein the retainer member detains the valve assembly in a fixed position relative to the main body. The clip may be inserted orthogonally relative to a longitudinal axis defined by the main body. The valve assembly may have an open configuration in which a fluid flow path is defined through the retainer member, the clip, the valve assembly and the main body. The retainer member may abut a seal member disposed within the valve assembly. The main body may be a unitary member.

In another aspect, this disclosure is directed to a fluid coupling that includes a main body defining an internal space; a valve assembly in the internal space; and a retainer member coupled with the main body and arranged to detain the valve assembly in a fixed position relative to the main body.

Such a fluid coupling may optionally include one or more of the following features. The main body may be a unitary member. The valve assembly may have a first configuration in which: (i) a fluid flow path is opened through the fluid coupling and (ii) a second configuration in which the fluid flow path is closed.

Some embodiments of the devices, systems and techniques described herein may provide one or more of the following advantages. First, the fluid couplings described herein are designed to prevent spillage or escape of fluid when initially connecting the couplings and when disconnecting the couplings after use. By preventing spillage, material loss, soiling, contamination and costs associated with spillage may be reduced.

Second, the fluid couplings described herein are designed to prevent the inclusion of air into the fluid, as can often result during the process of joining male and female couplings together. By preventing air inclusion, the fluid is maintained in its most desired state.

Third, in some embodiments the fluid couplings described herein include internal shut-off valves to prevent fluid spillage.

Fourth, some embodiments of the fluid couplings described herein are designed with minimal component parts and/or modules, and are designed for easy assembly so that the fluid couplings are economical to produce. A modular construction, in accordance with some embodiments, may provide advantages such as manufacturing flexibility and user flexibility. For example, a single module can be designed for use in multiple different form factor types of fluid couplings. Accordingly, modular constructions can facilitate associated manufacturing efficiency advantages and inventory carrying cost reductions. Users of modular fluid couplings may also benefit from reduced costs due to the need to carry fewer and/or less costly spare parts.

Fifth, in some embodiments the fluid couplings described herein include a robust latching system that is also convenient for decoupling the male and female couplings from each other. For example, a latch component of the female coupling may simply be depressed and the male and female couplings can then be separated from each other. In addition, there is no action required on the female portion of the fluid coupling to make a connection with a male coupling. The male and female can be simply pushed into engagement with each other.

Sixth, the fluid couplings described herein are designed to provide tactile feedback when the male and female portions of the fluid coupling are snapped together in the coupled configuration.

In some embodiments described herein, the fluid coupling devices described herein have a modular construction. That is, one or both of the coupling halves can include a core module that can be used in various types of fluid coupling outer bodies. In some embodiments, the core module includes a valve, a spring, and one or more fluid seals.

The details of one or more implementations are set forth in the accompanying drawings and the description below.

Other features and advantages will be apparent from the description and drawings, and from the claims.

BRIEF DESCRIPTION OF DRAWINGS

The present description is further provided with reference to the appended Figures, wherein like structure is referred to by like numerals throughout the several views, and wherein.

DETAILED DESCRIPTION OF ILLUSTRATIVE EMBODIMENTS

This document describes fluid handling couplings. For example, this document describes fluid couplings that are designed to prevent spillage of fluid when connecting and disconnecting the couplings. In some embodiments, the fluid couplings described herein include internal valve components. In example embodiments, the fluid couplings are designed with minimal component parts and are designed for easy assembly so that the fluid couplings are economical to produce.

Figure 1:
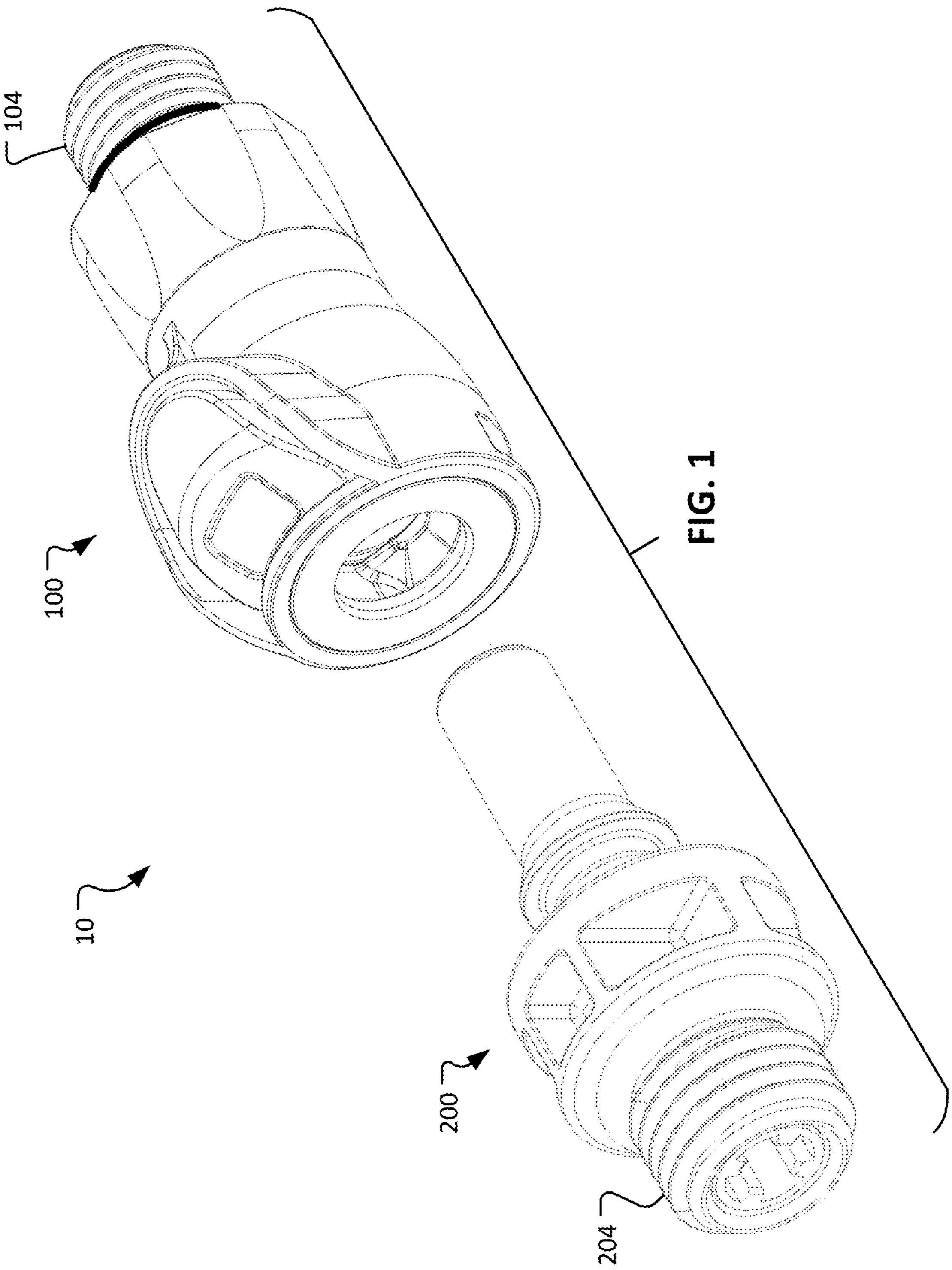
FIG. 1 is perspective view of an example fluid coupling system, with the male coupling and the female coupling in an uncoupled arrangement.

FIG. 1 provides a view of an example fluid coupling system 10 in an uncoupled arrangement. The fluid coupling system 10 includes a female coupling 100 and a male coupling 200. The female coupling 100 and the male coupling 200 can be connected to establish a fluid flow path extending between a female coupling termination 104 and a male coupling termination 204, and thereafter disconnected (as shown) to close the fluid flow path (each of the female coupling 100 and the male coupling 200 closing the fluid flow path therethrough when uncoupled). Hence, the female coupling 100 and the male coupling 200 are releasably coupleable. In the depicted embodiment, an actuatable latch is included to releasably detain the female coupling 100 and the male coupling 200 in a coupled configuration (as described further below). In some embodiments, no such latch is included. In such a case, the female coupling 100 and the male coupling 200 can be mechanically forced toward each other and then held in that arrangement to put/keep them in the coupled configuration.

As used herein, the term "fluid" means any substance that can be made to flow including, but is not limited to, liquids, gases, granular or powdered solids, mixtures or emulsions of two or more fluids, suspensions of solids within liquids or gases, gels, vapors, steam, mists, etc., without limitation.

The materials from which one or more of the components of the male fluid coupling 200 and the female fluid coupling 100 (and other fluid couplings described herein) can be made of include thermoplastics. In particular embodiments, the materials from which the components of the male fluid coupling 200 and the female fluid coupling 100 are made of are thermoplastics, such as, but not limited to, acetal, ABS, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the male fluid coupling 200 and the female fluid coupling 100 are made of include metals such as, but not limited to copper, stainless steel, brass, aluminum, plated steel, zinc alloys, and the like. In particular embodiments, one or both of the male fluid coupling 200 and/or the female fluid coupling 100 is/are metallic-free.

In some embodiments, as described further below, the male fluid coupling 200 and/or the female fluid coupling 100 can include one or more seal members. In some embodiments, the seal members can comprise materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shape of such seal members can be circular, D-shaped, X-shaped, square, rectangular, U-shaped, multi-lobed, L-shaped, V-shaped, and the like, or any other suitable shape, without limitation.

In the depicted embodiment, the female coupling termination 104 is a threaded fitting, and the male coupling termination 204 is a barbed fitting. In some embodiments, the female coupling termination 104 and/or the male coupling termination 204 can be any other suitable type of fitting or connection such as, but not limited to, a compression fitting, a quick disconnect, a sanitary fitting, hydraulic quick connection, luer fitting, a solder connection, a welded connection, a threaded connection (e.g., straight thread or pipe thread), and so on, without limitation. Such connections can be straight (as depicted) or in another arrangement such as, but not limited to, a 90° elbow arrangement, a 45° elbow, a straight fitting, a Tee fitting, a Y-fitting, and so on. In some embodiments, the male coupling 200 and/or the female coupling 100 can be configured to be fluidly coupled with a fluid conduit such as, but not limited to, a tube, pipe, a manifold, and the like, without limitation. In some embodiments, multiple female couplings 100 can be connected to, or embedded into, a common manifold. Such an arrangement may have, or may not have, latches.

Figures 2A, 2B:
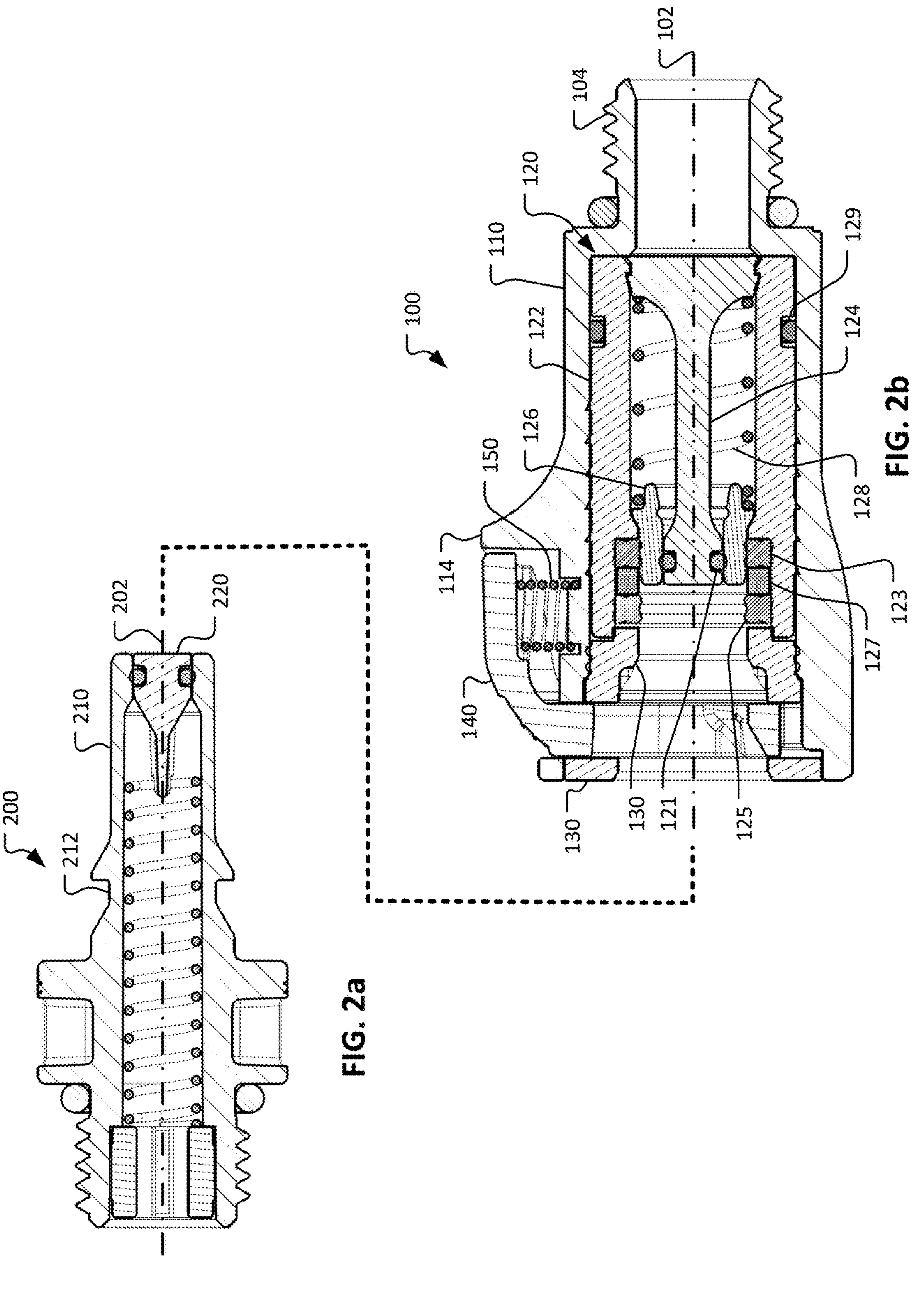
FIGS. 2*a* and 2*b* show longitudinal cross-section views of the male coupling and the female coupling of FIG. 1.

FIGS. 2*a* and 2*b* show the female coupling 100 and the male coupling 200 in longitudinal cross-section so that the components of the female coupling 100 and the male coupling 200 are readily visible. The female coupling 100 defines a longitudinal axis 102. The male coupling 200 defines a longitudinal axis 202.

The female coupling 100 is designed to releasably receive the male coupling 200. That is, the male coupling 200 can be inserted into the female coupling 100 by aligning the longitudinal axes 102/202 and pressing the male coupling 200 and the female coupling 100 toward each other.

In the depicted embodiment, the male coupling 200 will latch in the coupled configuration with the female coupling 100. That is, the male coupling 200 will remain detained in the coupled configuration with the female coupling 100. Alternatively, in some embodiments the male coupling 200 and the female coupling 100 do not latch to each other in the coupled configuration. Instead, the male coupling 200 and the female coupling 100 will remain in the coupled configuration only by maintaining the application of a compressive force to press and hold the two together in the coupled configuration.

The female coupling 100 includes a main body 110, a valve assembly 120, a retainer member 130, an optional clip 140, and a spring 150. The valve assembly 120 (which can also be referred to as a valve cartridge 120) is disposed within an internal space 112 (FIG. 4) defined by the main body 110. The construction and operation of the valve assembly 120 will be described further below.

The retainer member 130 is also disposed within the internal space defined by the main body 110. The retainer member 130 abuts against the valve assembly 120 and longitudinally restrains the valve assembly in the internal space of the main body 110. That is, the valve assembly 120 is restrained longitudinally between the retainer member 130 and the main body 110. The retainer member 130 detains the valve assembly 120 in a fixed position relative to the main body 110.

The clip 140, which is optional, is movably coupled to the main body 110. The clip 140 is movable transversely, perpendicularly, and/or orthogonally with respect to the longitudinal axis 102 of the main body 110 (e.g., FIG. 4). When the male coupling 200 is being pressed into the coupled configuration with the female coupling 100, the main body 210 of the male coupling 200 will force the clip 140 downward (referring to the orientation of the female coupling 100 in FIG. 2*b*), and then the clip 140 will snap back upward to engage within an annular clip groove 212 defined by the main body 210 of the male coupling 200. The spring 150 biases the clip 140 to snap back upward. In that manner, the male coupling 200 becomes releasably latched in the coupled configuration with the female coupling 100. While in the depicted embodiment the spring 150 is a coil spring, in some embodiments the clip 140 can include a molded-in cantilever spring that can be substituted for the coil spring.

To unlatch the male coupling 200 from the female coupling 100, a user can simply depress the clip 140 to disengage the clip 140 from the clip groove 212. Then, the male coupling 200 can be separated from the female coupling 100.

When the female coupling 100 and the male coupling 200 are in the coupled configuration, a fluid flow path through the fluid coupling system 10 (FIG. 1) is opened. When the female coupling 100 and the male coupling 200 are uncoupled from each other, internal valves within the female coupling 100 and the male coupling 200 close or block the fluid flow path through the fluid coupling system 10. The internal valves help to prevent fluid spillage when the female coupling 100 and the male coupling 200 are separated.

As described further below, the clip 140 is used to detain the retainer member 130 in a fixed position relative to the main body 110. Accordingly, it can be said that the retainer member 130 detains the valve assembly 120 in a fixed position relative to the main body 110, and the clip 140 detains the retainer member 130 in a fixed position relative to the main body 110.

The valve assembly 120 of the depicted embodiment can be pre-assembled (as a sub-assembly) prior to its insertion into the interior space 112 (FIG. 4) of the main body 110. In such a case, a pre-assembled valve assembly 120 can simply be moved/pushed into the interior space 112 into the depicted arrangement relative to the main body 110. Then, the retainer member 130 can be installed. Then, the clip 140 can be installed by inserting it transversely to the longitudinal axis 102. Those relatively straightforward steps are all that is required to assemble the female coupling 100.

The valve assembly 120 includes a cartridge housing 122, a valve stem 124, a valve member 126, a spring 128, three seals 121/123/125, and a spacer 127. The valve stem 124 is coupled, attached, and/or affixed to the cartridge housing 122. The valve member 126 is disposed between the valve stem 124 and the cartridge housing 122. The valve member 126 is longitudinally movable between: (i) an open position in which a fluid flow path through the female fluid coupling 100 is defined and (ii) a closed position (as depicted) in which the fluid flow path is blocked by the valve member 126. The spring 128 is disposed between the valve member 126 and the valve stem 124. The spring 128 biases the valve member 126 to its closed position.

A front ring-shaped face of the main body 210 of the male coupling 200 abuts against and pushes the valve member 126 to its open position as the female coupling 100 and the male coupling 200 are being coupled together. In addition, a valve member 220 of the male coupling 220 is pushed to its open position by a front face of the valve stem 124 as the female coupling 100 and the male coupling 200 are being coupled together.

The valve assembly 120 also includes the three seals 121/123/125 and the spacer 127. The first seal 121 is disposed between a head of the valve stem 124 and the valve member 126 while the valve member 126 is in the closed position. The second seal 123 is disposed between the valve member 126, the spacer 127, and the cartridge housing 122 while the valve member 126 is in the close position. The third seal 125 is detained in the cartridge housing 122 by the retainer member 130 and the spacer 127. The spacer 127 is disposed between the second seal 123 and the third seal 125. The second seal 123, the spacer 127, and the third seal 125 are detained in a fixed orientation relative to the cartridge housing 122 by the retainer member 130. The third seal 125 seals against the main body 210 of the male coupling 200 while the female coupling 100 and the male coupling 200 are coupled, and/or while the female coupling 100 and the male coupling 200 are in the process of being coupled or uncoupled.

In the depicted embodiment, a fourth seal 129 is disposed between the cartridge housing 122 and the inner wall of the main body 110.

Figure 4:
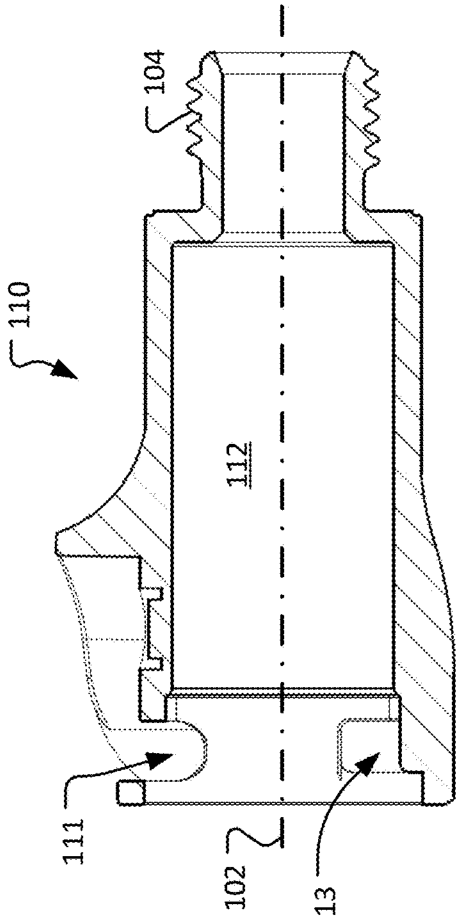
FIG. 4 is longitudinal cross-section view of the main body of FIG. 3.
Figure 5:
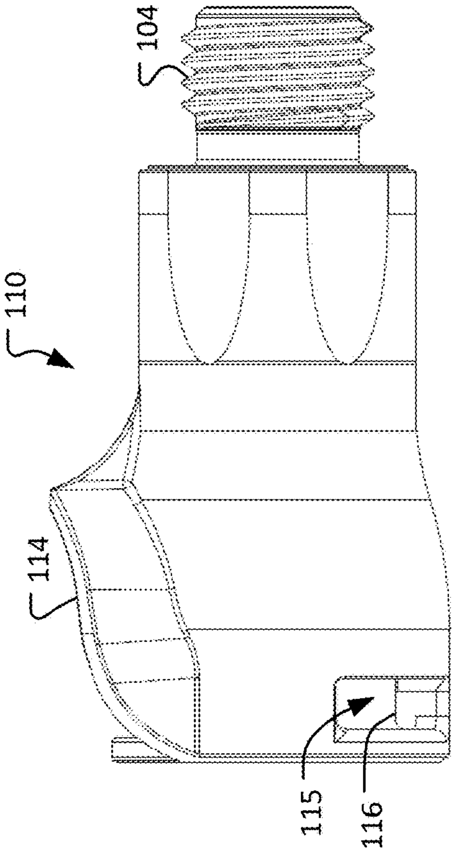
FIG. 5 is a side view of the main body of FIG. 3.
Figure 3:
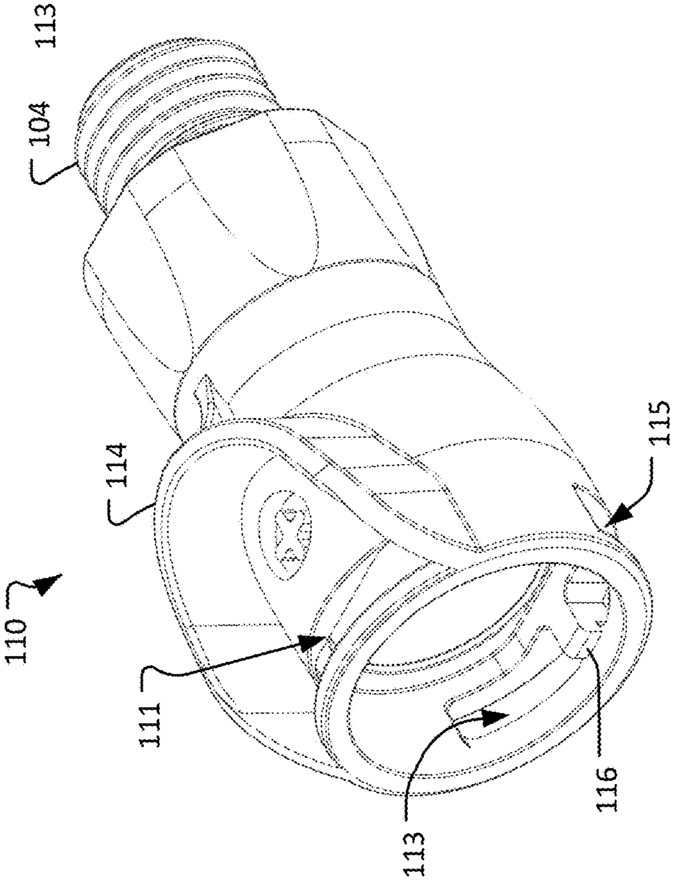
FIG. 3 is a perspective view of a main body of the female coupling of FIG. 1.

FIGS. 3-5 illustrate the main body 110 of the female coupling 100 in isolation so that greater detail of the main body 110 is visible. In some embodiments, the main body 110 is a unitary molded member. Accordingly, the main body 110 can be produced economically. Alternatively, in some embodiments the main body 110 can be made of a two or more piece construction.

The main body 110 defines the longitudinal axis 102 and the internal space 112. The main body 110 includes a U-shaped shroud 114 that surrounds a thumb pad of the clip 140 (FIG. 2*b*) to protect it from unintentional activation.

The main body 110 also defines a first slot 111, a second slot 113, and a third slot 115 through the wall of the main body 110. Portions of the clip 140 (FIGS. 2*b* and 18-20) are disposed in each of the first slot 111, the second slot 113, and the third slot 115. It can be said that the portions of the clip 140 are slidably disposed in each of the first slot 111, the second slot 113, and the third slot 115.

The main body 110 includes a web 116 that separates the second slot 113 and the third slot 115. The web 116 strengthens the end portion of the main body 110 where the second slot 113 and the third slot 115 are located. The strength provided by the web 116 is advantageous because when the female coupling 100 and the male coupling 200 are coupled and pressurized by a fluid, the clip is forced longitudinally toward the male coupling 200 and the main body 110 could thereby deform if not for the tensile strength provided by the web 116.

In some embodiments, as described above, no clip 140 is included. In such a case, the main body 110 may not have the slots 111/113/115. Instead, a retainer member (similar to the retainer member 130, but without the slots) can otherwise be secured to the main body 110. In that manner the retainer member can detain the valve assembly 120 within the internal space 112 of the main body 110.

Figure 7:
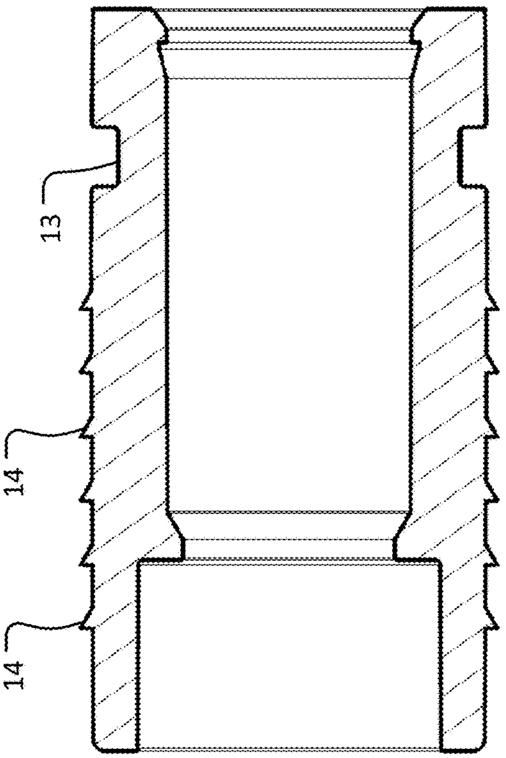
FIG. 7 is a longitudinal cross-sectional view of the valve cartridge housing of FIG. 6.
Figure 8:
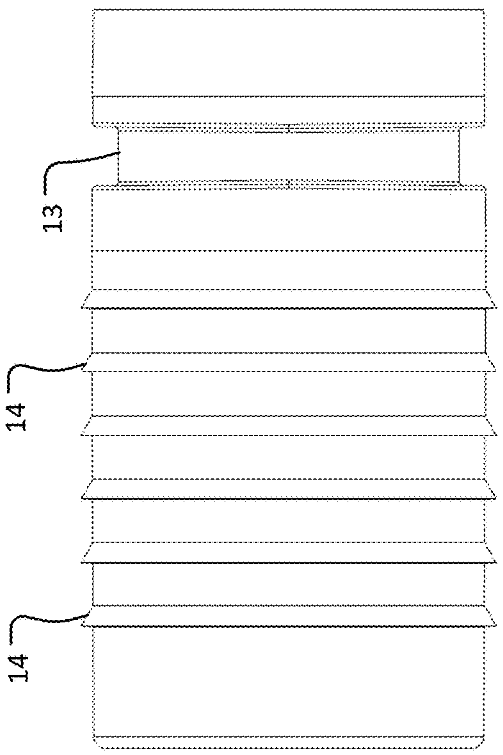
FIG. 8 is a side view of the valve cartridge housing of FIG. 6.
Figure 6:
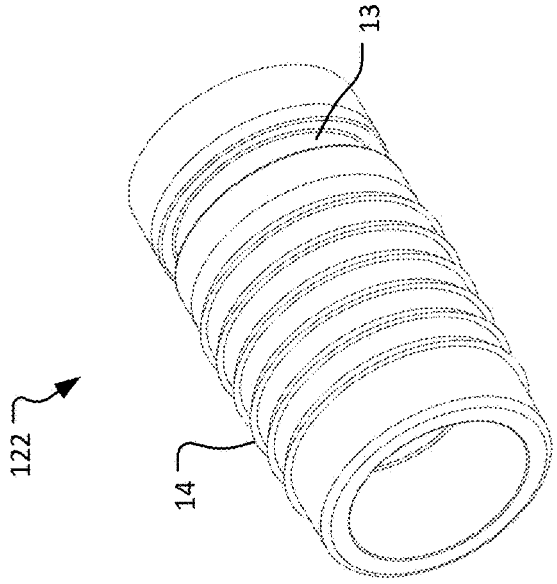
FIG. 6 is a perspective view of a valve cartridge housing of the female coupling of FIG. 1.

FIGS. 6-8 depict the cartridge housing 122 of the valve cartridge 120 in isolation. The inside of the valve cartridge 120 is configured to house the valve stem 124, valve member 126, spring 128, the seals 123/125, and the seal spacer 127 as shown in FIG. 2*b*. The cartridge housing 122 defines an annular seal groove 13 that receives the fourth seal 129 (FIG. 2*b*).

In some embodiments, the cartridge housing 122 also optionally includes a plurality of radially extending protrusions 14. In particular embodiments (such as the depicted embodiment), the radially extending protrusions 14 are circumferential barbs or ramps that are oriented to allow for the valve assembly 120 to be pressed into the internal space 112 of the main body 110, and thereafter to resist removal of the valve assembly 120 from the internal space 112. In some embodiments, the radially extending protrusions 14 can also be used to provide physical tolerance to fit the valve cartridge 120 into the internal space 112 of the main body 110. In that scenario the radially extending protrusions 14 could be circumferential or longitudinal, and can just be ribs, not barbs.

Figure 10:
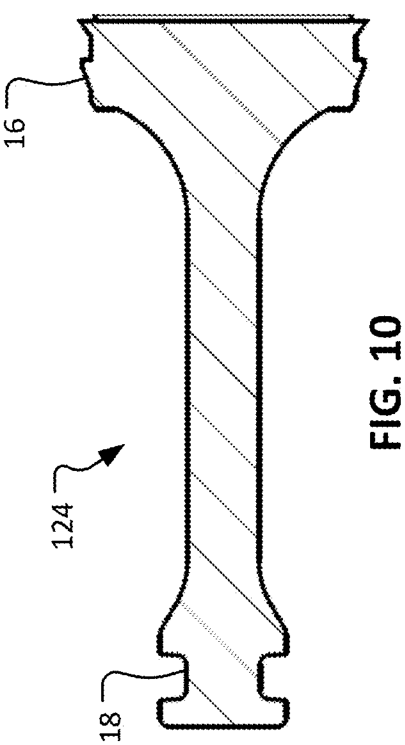
FIG. 10 is a longitudinal cross-section view of the valve stem of FIG. 9.
Figure 11:
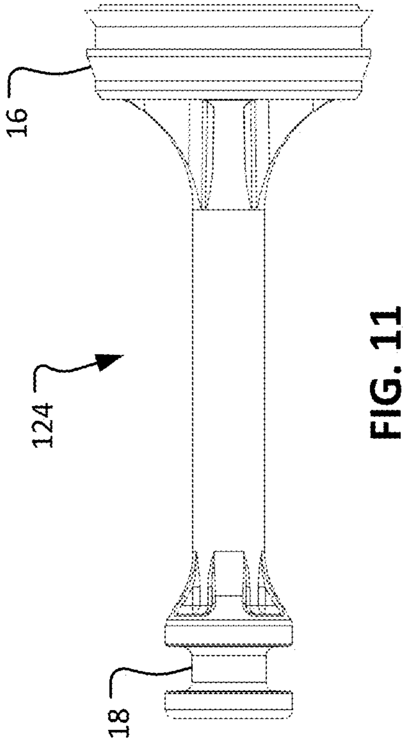
FIG. 11 is a side view of the valve stem of FIG. 9.
Figure 9:
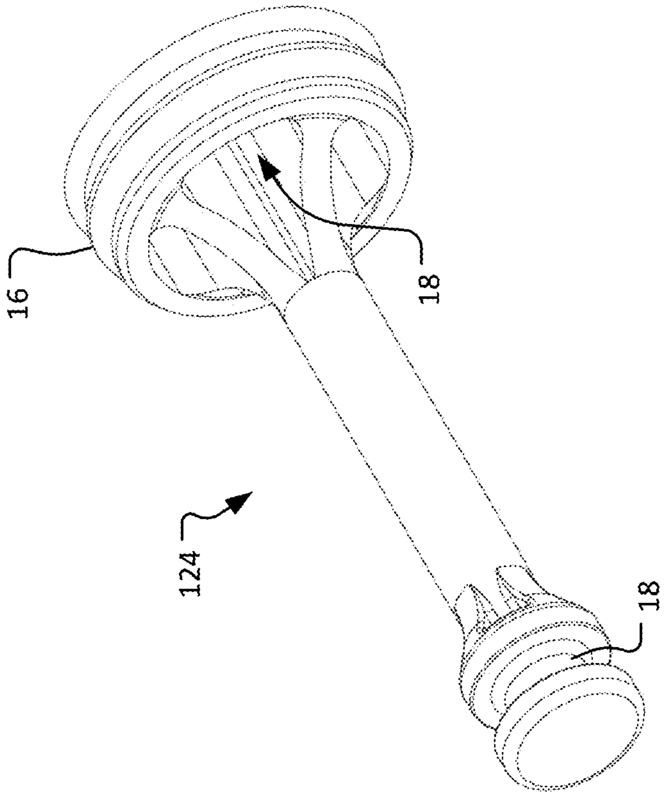
FIG. 9 is a perspective view of a valve stem of the female coupling of FIG. 1.

FIGS. 9-11 depict the valve stem 124 of the valve cartridge 120 in isolation. As shown in FIG. 2*b*, a first end portion 16 of the valve stem 124 is coupled to the cartridge housing 122 in the depicted embodiment, or to the main body 110 in some embodiments. The first end portion 16 defines one or more open fluid passageways 18 (four passageways 18 in the depicted embodiment) through which a fluid is allowed to flow. The other end of the valve stem 124 (the head of the valve stem 124) defines a seal groove 18 that receives the first seal 121 (as shown in FIG. 2*b*).

Figure 13:
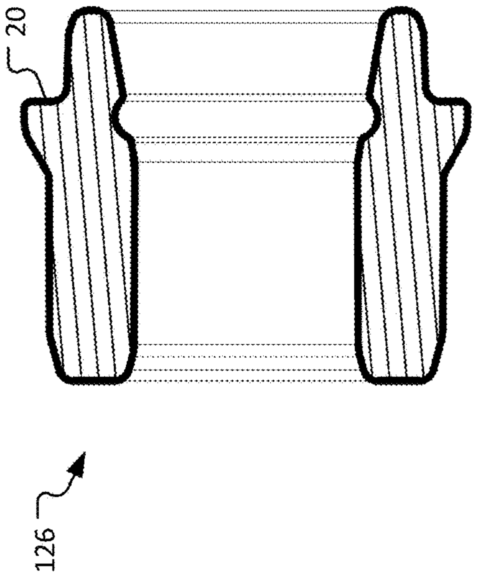
FIG. 13 is a longitudinal cross-section view of the valve member of FIG. 12.
Figure 14:
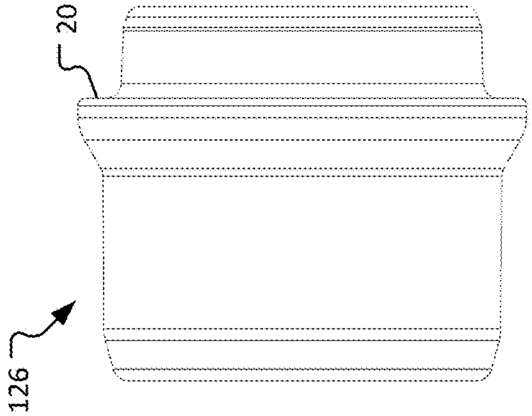
FIG. 14 is a side view of the valve member of FIG. 12.
Figure 12:
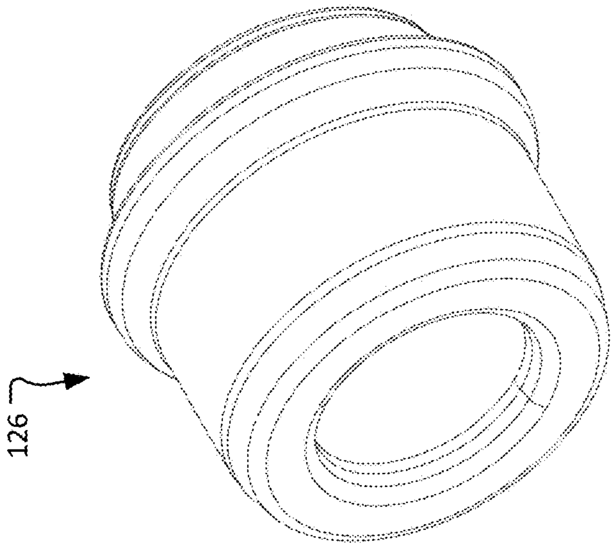
FIG. 12 is a perspective view of a valve member of the female coupling of FIG. 1.

FIGS. 12-14 depict the valve member 126 of the valve cartridge 120 in isolation. The valve member 126 movably surrounds a portion of the valve stem 124 as shown in FIG. 2*b*. The valve member 126 includes a radially projecting shoulder 20 against which the spring 128 bears to bias the valve member 126 to its closed position.

Figure 16:
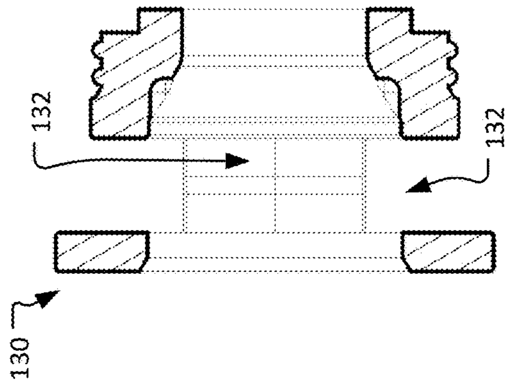
FIG. 16 is longitudinal cross-section view of the retainer member of FIG. 15.
Figure 17:
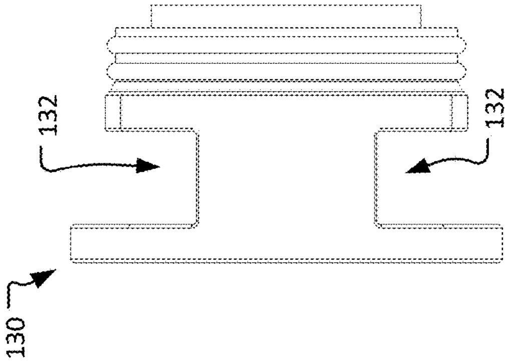
FIG. 17 is a side view of the retainer member of FIG. 15.
Figure 15:
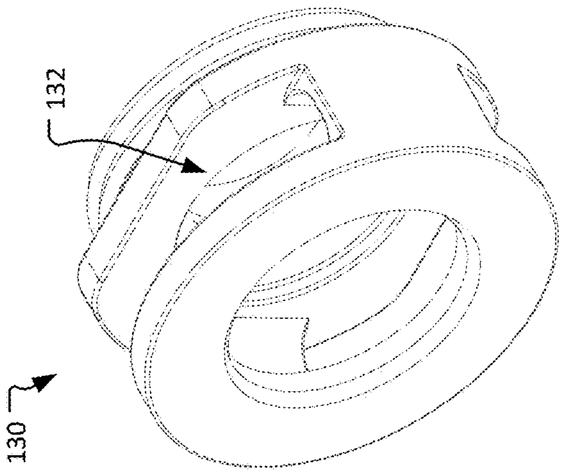
FIG. 15 is a perspective view of a retainer member of the female coupling of FIG. 1.

FIGS. 15-17 depict the retainer member 130 of the female coupling 100 in isolation. The retainer member 130 functions to retain the valve cartridge 120 in the internal space 112 of the main body 110. Accordingly, the retainer member 130 is coupled to the main body 110. In some embodiments, the retainer member 130 is coupled to the main body 110 via a press fit, by welding, using an adhesive, snap fit, threading, or other suitable means. In addition, the clip 140 (when included) mechanically couples the retainer member 130 to the main body 110.

The retainer member 130 defines a radially extending slot 132 passing through the retainer member 130. In particular, the slot 132 includes two wall openings and a center open space. When the retainer member 130 is installed in the main body 110, the slot 132 aligns with the slots 111/113/115 of the main body 110 (see FIGS. 3-5). The clip 140 (when included) is disposed within both of the wall openings of the slot 132 and the slots 111/113/115 of the main body 110 to mechanically couple the retainer member 130 to the main body 110 (as shown in FIG. 2*b*). In particular, the clip 140 is slidably disposed within both of the wall openings of the slot 132 and the slots 111/113/115 of the main body 110. In some embodiments, retainer member 130 includes annular ribs on an outer diameter surface of the retainer member 130. Such ribs can provide retention between the retainer member 130 and the main body 110 and/or physical tolerance for a snug fit therebetween.

Figure 20:
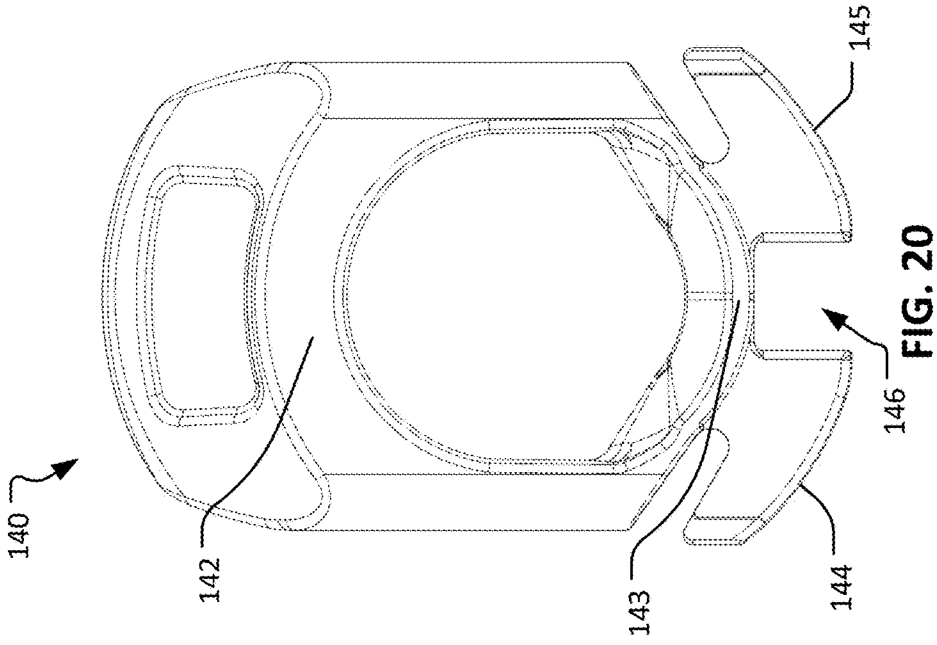
FIG. 20 is a front view of the clip of FIG. 18.
Figure 19:
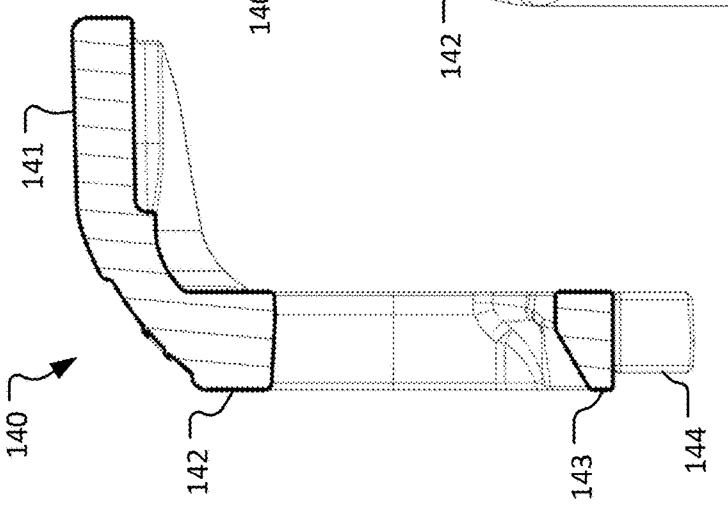
FIG. 19 is a longitudinal cross-section view of the clip of FIG. 18.
Figure 18:
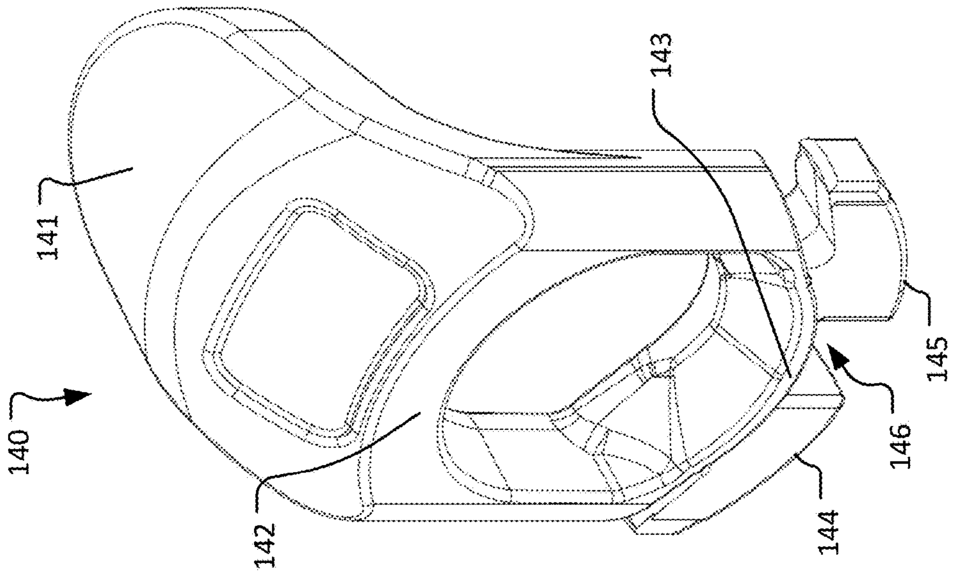
FIG. 18 is a perspective view of a clip component of the female coupling of FIG. 1.

FIGS. 18-20 depict the clip 140 of the female coupling 100 in isolation. As described above, the clip 140 functions to releasably latch the male coupling 200 and the female coupling 100 in the fully coupled configuration. By radially depressing a thumb pad 141 of the clip 140, a user can uncouple the male coupling 200 from the female coupling 100.

The clip 140 is movable in relation to the main body 110 and the retainer member 130. The clip 140 also functions to couple the retainer member 130 to the main body 110. To accomplish this coupling of the retainer member 130 to the main body 110, a first portion 142 of the clip 140 passes through (and is engaged within) the first slot 111 of the main body (FIGS. 3-5), and also through a first one of the wall openings of the slot 132 of the retainer member 130 (FIGS. 15-17) as shown in FIG. 2*b*. In addition, a second portion 143 of the clip 140 passes through (and is engaged within) a second one of the wall openings of the slot 132 of the retainer member 130. Further, a fourth portion 144 of the clip 140 is engaged within the second slot 113 of the main body 110, and a fifth portion 145 of the clip 140 is engaged within the third slot 115 of the main body 110.

The clip 140 defines an opening 146 between the second portion 143, the fourth portion 144, and the fifth portion 145. The opening 146 is U-shaped and slidably receives the web 116 of the main body 110 (FIGS. 3-5).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid coupling comprising:

a valve cartridge configured to be positioned within an outer housing;

a retainer member configured to be positioned within the outer housing and to detain the valve cartridge in a fixed position relative to the outer housing; and a detainment member configured to extend through a first opening defined by the retainer member and to detain the retainer member in a fixed position relative to the outer housing.

2. The fluid coupling of claim 1, wherein the detainment member is a clip that is movably coupled with the retainer member.

3. The fluid coupling of claim 2, wherein, while a valve member of the valve cartridge is in an open position, a fluid flow path extends through openings defined by the retainer member, the clip, and the valve cartridge.

4. The fluid coupling of claim 3, wherein the valve cartridge further comprises a spring positioned to bias the valve member to a closed position that blocks the fluid flow path.

5. The fluid coupling of claim 1, wherein the detainment member is perpendicularly movable relative to a longitudinal axis defined by the valve cartridge.

6. The fluid coupling of claim 1, wherein the valve cartridge comprises:

a cartridge housing;

a valve stem coupled to the cartridge housing; and a valve member disposed between the valve stem and the cartridge housing, the valve member being longitudinally movable between: (i) an open position in which a fluid flow path through the fluid coupling is defined and (ii) a closed position in which the fluid flow path is blocked.

7. The fluid coupling of claim 6, wherein the valve cartridge further comprises:

a first seal disposed between the valve stem and the valve member while the valve member is in the closed position;

a second seal disposed between the valve member and the cartridge housing while the valve member is in the closed position; and a third seal detained in the cartridge housing by the retainer member.

8. The fluid coupling of claim 6, wherein the cartridge housing includes a plurality of radially-extending circumferential barbs.

9. The fluid coupling of claim 8, wherein the plurality of radially-extending circumferential barbs are configured to frictionally engage with an inner wall of the outer housing.

10. The fluid coupling of claim 1, wherein the detainment member is engaged within the first opening and a second opening defined by the retainer member.

11. A fluid coupling comprising:

an outer housing;

a valve cartridge configured to be positioned within the outer housing;

a retainer member configured to be positioned within the outer housing and to detain the valve cartridge in a fixed position relative to the outer housing;

a detainment member configured to extend through an opening defined by the outer housing and to detain the retainer member in a fixed position relative to the outer housing; and a fourth seal disposed between the valve cartridge and the outer housing, wherein at least part of the valve cartridge and at least part of the retainer member are positioned between the fourth seal and the opening defined by the outer housing along a longitudinal axis of the fluid coupling.

12. The fluid coupling of claim 11, wherein the detainment member is perpendicularly movable relative to a longitudinal axis defined by the valve cartridge.

13. The fluid coupling of claim 11, wherein the valve cartridge comprises:

a cartridge housing;

a valve stem coupled to the cartridge housing; and a valve member disposed between the valve stem and the cartridge housing, the valve member being longitudinally movable between: (i) an open position in which a fluid flow path through the fluid coupling is defined and (ii) a closed position in which the fluid flow path is blocked.

14. The fluid coupling of claim 13, wherein the valve cartridge further comprises:

a first seal disposed between the valve stem and the valve member while the valve member is in the closed position;

a second seal disposed between the valve member and the cartridge housing while the valve member is in the closed position; and a third seal detained in the cartridge housing by the retainer member.

15. The fluid coupling of claim 13, wherein the cartridge housing includes a plurality of radially-extending circumferential barbs.

16. The fluid coupling of claim 15, wherein the plurality of radially-extending circumferential barbs are configured to frictionally engage with an inner wall of the outer housing.

17. The fluid coupling of claim 11, wherein the detainment member is engaged within two openings defined by the retainer member.

18. A fluid coupling comprising:

an outer housing;

a valve cartridge configured to be positioned within the outer housing;

a retainer member configured to be positioned within the outer housing and to detain the valve cartridge in a fixed position relative to the outer housing; and a detainment member configured to extend through an opening defined by the outer housing and to detain the retainer member in a fixed position relative to the outer housing, wherein the detainment member is movably coupled with the outer housing while received through the opening defined by the outer housing.

19. The fluid coupling of claim 18, wherein, while a valve member of the valve cartridge is in an open position, a fluid flow path extends through openings defined by the retainer member, the detainment member, and the valve cartridge.

20. The fluid coupling of claim 19, wherein the valve cartridge further comprises a spring positioned to bias the valve member to a closed position that blocks the fluid flow path.

* * * * *